No. 759,194. PATENTED MAY 3, 1904.
G. T. SCHULTZ.
TEA KETTLE.
APPLICATION FILED DEC. 28, 1903.
NO MODEL.

Witnesses
Robert Garrett
James L. Norris Jr.

Inventor
Galen T. Schultz
By James L. Norris
Atty.

No. 759,194.

Patented May 3, 1904.

UNITED STATES PATENT OFFICE.

GALEN T. SCHULTZ, OF SIOUX CITY, IOWA, ASSIGNOR, BY DIRECT AND MESNE ASSIGNMENTS, OF TWO-THIRDS TO M. E. SILVER, OF SIOUX CITY, IOWA.

TEA-KETTLE.

SPECIFICATION forming part of Letters Patent No. 759,194, dated May 3, 1904.

Application filed December 28, 1903. Serial No. 186,893. (No model.)

*To all whom it may concern:*

Be it known that I, GALEN T. SCHULTZ, a citizen of the United States, residing at Sioux City, in the county of Woodbury and State of Iowa, have invented new and useful Improvements in Tea-Kettles, of which the following is a specification.

This invention relates to tea-kettles, and has for its object to provide a tea-kettle of improved construction by means of which a saving is effected in the time required to bring the water or other liquid contained in the kettle to the boiling-point and also to effect economy in the use of fuel.

It has for a further object to provide a device of the class described in which the heat after serving to heat the water or other liquid contents of the kettle may be utilized for cooking or other purposes.

To these ends my invention consists in the features and in the construction, combination, and arrangement of parts hereinafter described, and particularly pointed out in the claims following the description, reference being had to the accompanying drawings, forming a part of this specification, wherein—

Figure 1:
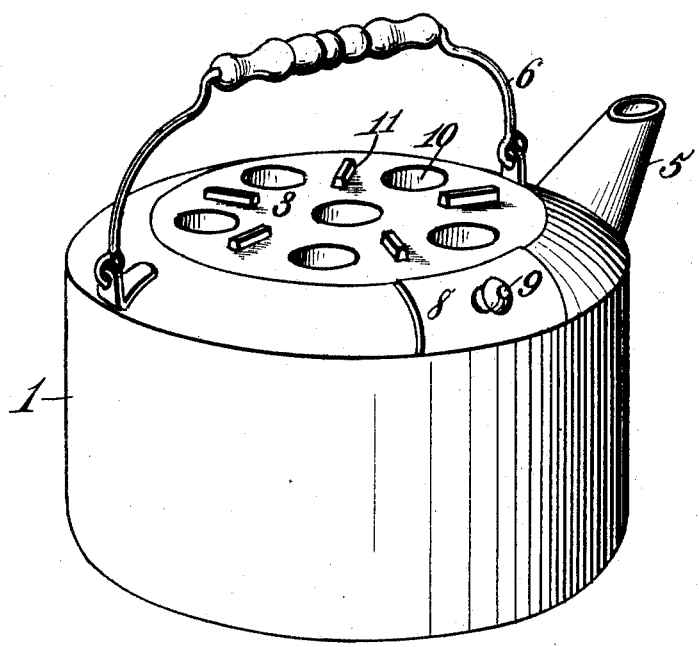
Figure 2:
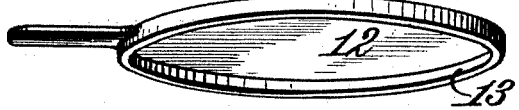
Figure 3:
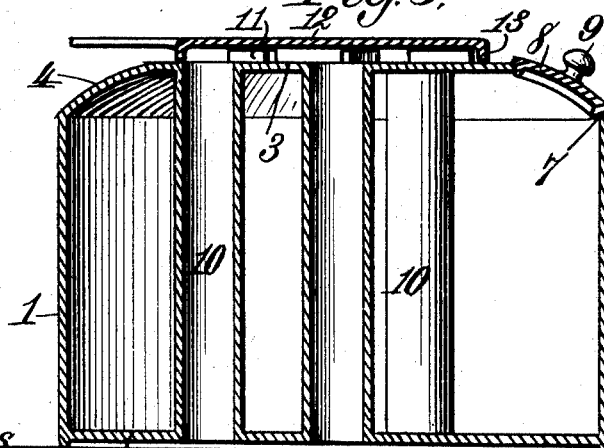

Figure 1 is a perspective view of the kettle, the lid or cover being shown as removed. Fig. 2 is a similar view of the lid or cover; and Fig. 3 is a vertical sectional view of the kettle, taken on the line 3 3 of Fig. 1.

The numeral 1 indicates the body of the kettle, which in the present instance is shown as being cylindrical in shape, said body having a bottom 2.

The numeral 3 indicates the top of the kettle, which is shown as being flat except on its circumference, the circumference or outer edge of the cover being preferably curved, as indicated at 4. The kettle is also provided with a spout 5 on one side, which preferably communicates with the interior of the kettle at or near the bottom of the latter, and the kettle is provided with the usual bail or handle 6.

Formed in the curved portion 4 of the top is an opening 7, through which the water or other liquid to be heated may be introduced into the kettle, and said aperture is adapted to be closed by a lid 8, provided with a handle 9, by means of which the lid may be placed in position and removed, as desired.

Extending vertically through the kettle is a plurality of tubes 10, which extend through the bottom 2 of the kettle and also through the flat portion 3 of the top of the kettle, said tubes being open from end to end and secured in the top and bottom of the kettle in any suitable manner, the tubes thus constituting flues for the passage therethrough of heat.

Formed on the top 3 of the kettle, and preferably intermediate the outer flues 10, as most clearly shown in Fig. 1 of the drawings, are radially-projecting ribs 11, which project a slight distance above the flat top 3 and form supports and guides for the removable cover 12. Said removable cover is formed in the shape of a flat annular disk provided at its edge with a depending annular flange 13, the cover being of such size and the ribs 11 being arranged in such manner that when the cover is placed on the flat top of the kettle it will be supported on the ribs 11 and the flange 13 will rest on the flat top 3 and will encircle the outer ends of the ribs 11, said ribs thus holding the cover centrally in place and insuring its covering the upper open ends of all the flues 10.

The operation of the improved kettle is as follows: By removing the lid 8 the water or other liquid intended to be heated may be introduced into the kettle through the aperture 7, and the aperture should then be closed by placing thereover the lid 8. The kettle may now be placed over any suitable supply of heat—as, for example, over an open stove-hole—and by removing the lid or cover 12 the heat will not only be supplied to the bottom of the kettle, but it will also pass up through the tubes or flues 10, thus bringing the heat intimately into contact with the water or other liquid to be heated, and thereby quickly bringing the liquid to the boiling-point, thus effecting an economy in the time and fuel consumed in heating the liquid. By placing a saucepan or other cooking utensil on the ribs 11 the heat escaping from the flues may be utilized for cooking food or for other purposes. When a hot fire, however, is desired in cooking, while the liquid in the kettle is brought to the boiling-point or is boiling the lid or cover 12 should be kept in place upon the top of the kettle, so as not to interfere with the draft of the stove.

By forming the central portion of the top 3 flat in the manner shown means are provided for supporting a cooking utensil whereby the heat after passing through the kettle is utilized for cooking food in the upper vessel, and the ribs 11 serve as supports for the cooking vessel, while the convex outer portion 4 of the cover gives to the cover added strength in order to enable it to support the cooking vessel. The ribs 11, while serving as a support for the cooking vessel, also serve as supports and guides for the cover 12 in the manner before explained.

Having described my invention, what I claim is—

1. A tea-kettle comprising a body portion having a top and bottom, and a plurality of open-ended tubes extending through the top and bottom, and vertically-projecting ribs formed on the top of the kettle and extending in radial directions, each of said ribs being disposed between the upper open ends of two of said tubes, substantially as and for the purpose specified.

2. A tea-kettle, comprising a body portion having a top and bottom and a plurality of open-ended tubes extending through the top and bottom, vertically-projecting ribs formed on the top of the kettle, and a cover having a depending flange on its edge adapted to fit about said ribs, substantially as described.

3. A tea-kettle, comprising a body portion having a top and bottom and a plurality of open-ended tubes extending through the top and bottom, radially-disposed vertically-projecting ribs formed on the top of the kettle, and a cover having a flange on its edge adapted to fit about said ribs, substantially as described.

4. A tea-kettle, comprising a body portion having a top and bottom, the top having a flat central portion and a convex outer portion, a plurality of open-ended tubes extending through the bottom and the flat portion of the top, vertically-projecting ribs formed on said flat top portion, and a removable cover having a depending flange adapted to surround said ribs, substantially as described.

5. A tea-kettle comprising a body portion having a top and bottom, the top having a flat central portion and a convex outer portion connecting the flat portion of the top with the vertical portion of the kettle, said convex outer portion being provided with a filling-aperture, a detachable lid for closing said aperture, and a plurality of open-ended tubes extending through the bottom and the flat portion of the top of the kettle, substantially as described.

In testimony whereof I have hereunto set my hand in presence of two subscribing witnesses.

GALEN T. SCHULTZ.

Witnesses:
C. W. TAYLOR,
C. A. BENTON.